DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 27, 1973

916. O.G. 1213

T916,010
COATING COMPOSITIONS
Charles H. Coney, 2008 Canterbury Road, Kingsport, Tenn. 37660
Filed May 14, 1973, Ser. No. 360,284
**Int. Cl. G03c *1/60***
U.S. Cl. 96—91 R
No Drawing. 6 Pages Specification

Coating compositions having cellulose propionate as the film-forming material and containing light-sensitive diazo compounds are disclosed. The cellulose propionate has from 0 to about 4.5% acetyl content by weight, from about 4.4% to about 12% hydroxyl content by weight and a propionyl content of 35% by weight or more. The cellulose propionate has a viscosity of between about 0.02 and 20 seconds, as measured by ASTM D–1343. The cellulose propionate and light-sensitive diazo compound are disclosed in a lower alcohol or a mixture of a lower alcohol and water and applied to a substrate. The coating, when dried by evaporation of the water and alcohol, may be developed by conventional techniques.